3,272,434
NUCLEATING PROCESS

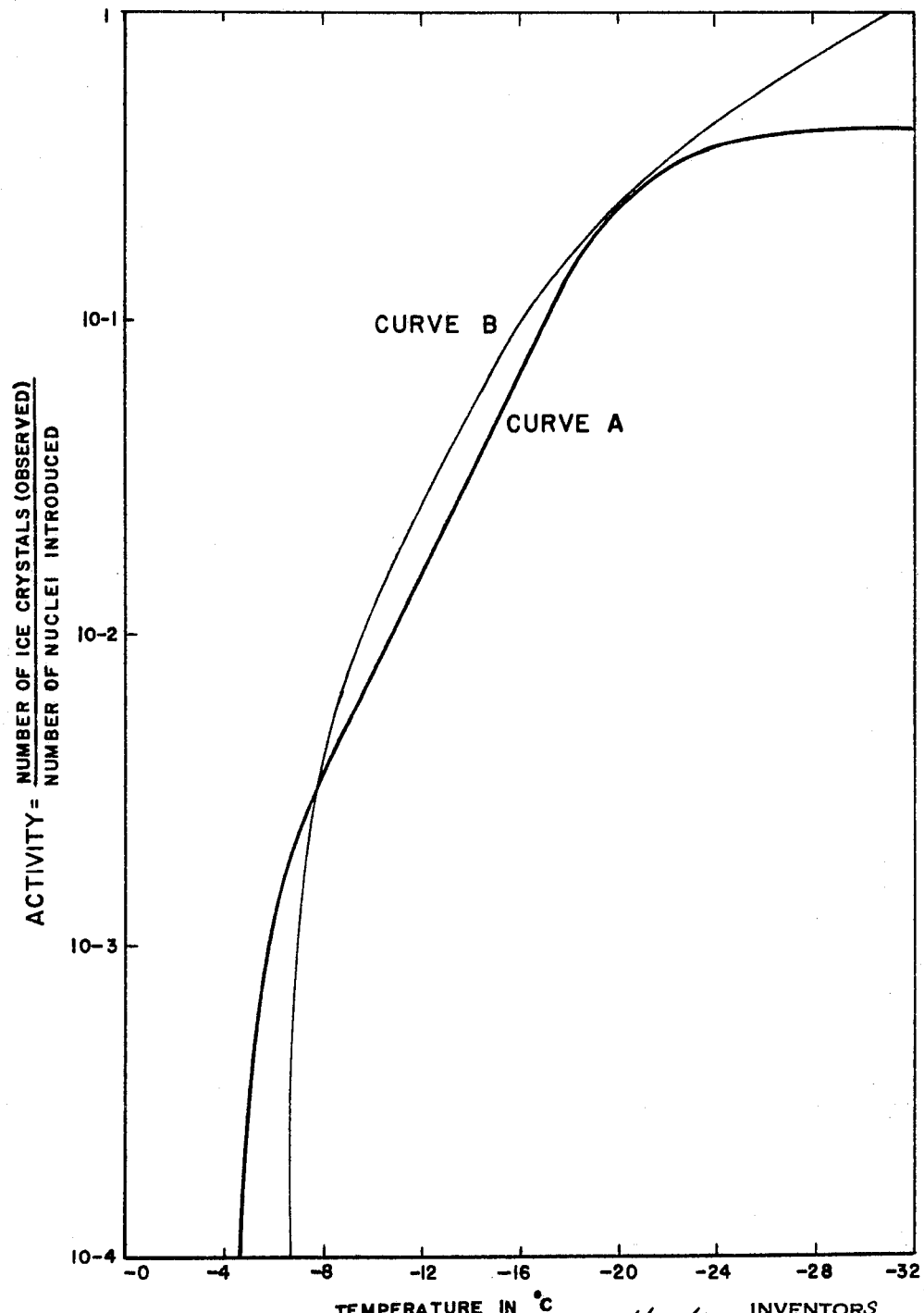

Albert C. Zettlemoyer, Diery's Bridge Road, R.D. 2, Bethlehem, Pa., John J. Chessick, Stafore Drive, R.D. 2, Bethlehem, Pa., and Noubar Tcheurekdjian, 1222 11th St., Racine, Wis.
Filed June 3, 1963, Ser. No. 285,134
20 Claims. (Cl. 239—2)

The present invention relates to freezing nucleating agents especially of the type which nucleate hydrogen-bonding crystals such as ice from liquid or from gaseous media, such as water clouds, and to processes of nucleation of hydrogen-bonding crystals.

A purpose of the invention is to create artificial nucleating agents to produce hydrogen-bonding crystals, which agents are competitive with the best prior agents available such as silver iodide and capable of production at much lower cost.

A further purpose is to create artificially an optimum proportion of hydrophilic sites on a predominately hydrophobic surface of a substrate, the area of hydrophilic sites ranging between 5 and 40 percent and preferably 20 and 30 percent.

A further purpose is to use an inorganic substrate which has largely hydrophilic sites, and to convert the surface to produce largely hydrophobic sites while leaving a residual proportion of hydrophilic sites within the critical percentage requirements.

A further purpose is to convert the desired proportion of hydrophilic sites to hydrophobic sites by selected heat treatment of the substrate.

A further purpose is to create the hydrophobic sites by adsorption or reaction with the surface, using such techniques as ion impregnation, physical adsorption, esterification, reaction with organic acid, deposition of resin, deposition of protein or the like.

A further purpose is to create initially the required proportion of hydrophobic and hydrophilic sites by flame hydrolysis of silicon compound to produce silica.

A further purpose is to convert selectively to the desired hydrophobic-hydrophilic balance of the surface of carbon black, by reduction or by volatilization of oxides from the surfaces.

Other purposes appear in the specification and in the claims.

In the drawings we have chosen to illustrate the relation between activity plotted as the ordinate and temperature plotted as the abscissa for one prior art nucleating agent and one of the new nucleating agents disclosed in the present application.

The present invention relates to a method of nucleating crystallization of a hydrogen-bonding crystal from liquid and gaseous media, and also to freezing nucleating agents for use in such media. Suitable gaseous media will be clouds in the atmosphere and also a layer in a cloud chamber, where nucleation of the formation of ice is of interest. Suitable liquid media will be water and other liquids from which the formation of crystals of a distinct phase such as ice or frozen hydrogen-bonding solvent are of interest.

The technique by which minute particles are introduced to nucleate or promote crystallization is often referred to as seeding. The invention therefore concerns powders which are capable of seeding the formation of crystals in gaseous media such as clouds and liquid media such as water and solvents generally.

In order for a freezing nucleating agent to be effective in the present invention, it should have a particle size in the range between 0.01 and 10 microns and preferably in the range between 0.03 and 1 micron.

Small size of the nucleating agent alone however is not enough. In the prior art, the best nucleating agent for cloud seeding has been silver iodide which is capable of initiating ice formation at about minus 4° C. if freshly prepared. The special character of the surface is very important. For example, ordinary silica sand, even though it may be of suitable particle size, is so ineffective as a nucleating agent that it only forms ice at or below minus 25° C.

We have discovered that it is possible to create artificially a whole series of very effective new nucleating agents, which compare favorably with silver iodide in their nucleating capabilities and are relatively inexpensive.

In accordance with the invention we employ as a substrate an inorganic material which in some cases is a mineral. A very desirable substrate is silica which will usually be of colloidal size, and may be produced by any one of several recognized techniques for making finely divided silica, including wet precipitation and flame hydrolysis.

The wet precipitation technique will usually start with a water soluble silicate such as sodium silicate and precipitate silica. The flame hydrolysis method ordinarily uses a flame created by hydrogen burning in oxygen or air and producing water and a silicon compound such as a silicon halide, for example, silicon tetrachloride or silicon tetrafluoride or silicon sulphide is burned.

Other suitable substrates besides silica are clay, for example, kaolin or ball clay; bauxite, alumina, magnesite, magnesia, limestone, dolomite, and lime. For many purposes, any suitable inorganic substrate which has a largely hydrophilic surface will be desirable.

We have discovered that in order to obtain effective nucleation of hydrogen-bonding crystals from liquid and gaseous media, it is important that the surface consist predominately of hydrophobic sites but that there be isolated hydrophilic sites present covering a critical proportion of the area. The hydrophilic sites should cover from 5 to 40 percent of the surface and preferably from 20 to 30 percent of the surface.

By a site we mean an area of atomic or small molecular dimensions which has an area in the range of 2 to 20 square angstroms. To determine this area percentage, one must measure the area taken up by water molecules (Braunauer-Emmett-Teller area) and the area taken up by the number of molecules of nitrogen or argon multiplied by approximately 16 square angstroms.

The water area is obtained by multiplying the number of water molecules adsorbed per gram times approximately 10.5 square angstroms. While we do not intend to limit to a particular theory, it would appear that the sites should be isolated so that there is no organized interference of the adsorbed nucleating molecules with each other. Therefore it can be shown by statistical mechanics that about one polar site for each four will provide such a suitable distribution.

Nucleating appears to be favorably influenced by cluster formation of the nucleating molecules about these isolated sites. The cluster appears to be randomly organized at first before it goes over into the crystal form. The step to form the eventual crystal may indeed be influenced by the surface geometry as has been widely supposed heretofore.

In accordance with the invention, it is therefore important to create a surface condition of the substrate which is largely hydrophobic but which has between 5 and 40 percent of the area covered by hydrophilic sites. We find that this can be done by two different techniques: (1) A surface which is largely hydrophilic can be converted into a surface which is largely hydrophobic while retaining sufficient hydrophilic sites; (2) A surface can be created which is initially largely hydrophobic, and which either initially has the desired proportion of hydrophilic sites or which is treated to give it the desired proportion of hydrophilic sites.

Considering first the creation of largely hydrophobic sites on an initially largely hydrophilic inorganic substrate, it will be seen that the character of the surface can be changed by physical means or chemical additives can be introduced.

In one technique for producing a nucleating agent according to the invention, a material which is initially largely hydrophilic, such as precipitated silica, for example produced by the reaction of hydrochloric acid and sodium silicate, or clay, magnesite, limestone, dolomite or some other material having largely hydrophilic sites, is initially reduced to a suitable size in the range between 0.01 and 10 microns and preferably between 0.03 and 1 micron. This is preferably done by precipitation or ultra fine grinding. The surface is then converted to a largely hydrophobic surface by heat treatment. The temperature of heat treating should be above 140° C. and for rapid results much higher temperature should preferably be used. The operation can be speeded up by using vacuum if desired. Thus, temperature, time and vacuum are the operating parameters which may be varied.

*Example 1*

Precipitated silica (HiSil X–303) which is initially largely hydrophilic has been converted into a very effective nucleating agent by heat treating for two hours at 450° C. and from 2 to 10 hours at 650° C. The particle size was ca 0.05 micron.

A sample of a size of 0.05 micron heat treated for two hours at 450° C. and three hours at 650° C. gave 26 percent hydrophilic sites. When tested in the cloud chamber, this gave initial ice (trace) at minus 3° C. and a significant mass of ice at minus 10° C. and massive amounts of ice at minus 14° C.

Another different approach for creating hydrophobic sites on a largely hydrophilic inorganic substrate is by adsorbing or reacting so as to deposit on the surface a material which will create hydrophobic sites. One approach is the technique of ion impregnation, by which a hydrophobic salt or a chemical compound which can create hydrophobic sites on the surface with or without chemical reaction is employed. Effective ion impregnating agents for creating hydrophobic sites on hydrophilic substrates of the characters mentioned above are metallic sulfides, such as cuprous sulfide, cadmium sulfide, and any other metallic sulfide, metallic halides such as zinc chloride, zinc iodide, lead chloride, lead iodide, silver chloride, silver fluoride, silver bromide, silver iodide, or any other metallic halide except the alkali halides. Outstandingly good compounds which apparently work because of chemical properties are silver nitrate and zinc nitrate, which appear to decompose at the temperature of ion impregnation. A suitable ion impregnating temperature is at the Tammann temperature of the solid to be impregnated, that is, the temperature at which the surface ions or atoms are mobile, which can be determined experimentally, and will as a practical matter be reasonably satisfied by having the temperature above about ½ to ⅔ the melting temperature of the solid in degrees absolute.

A suitable example for ion impregnation using silver nitrate on precipitated silica is as follows:

*Example 2*

Precipitated silica (HiSil X–303) can be used having a nitrogen area of 125 square meters per gram and a particle size of about 0.05 micron.

10 grams of this silica is ground together with 0.2 gram of silver nitrate. It is then heated to a temperature of about 850° C. for four hours. The product gives a nitrogen area of about 33 square meters per gram and the water area of about 10 square meters per gram.

Similar results can be obtained by absorption.

A specimen tested in the cloud chamber gave trace ice formation at minus 2° C., a significant amount of ice at minus 12° C. and a massive amount of ice at minus 14° C.

*Example 3*

Silver chromate is ion impregnated in the same precipitated silica at 850° C. for 4 hours after mixing 20 grams of precipitated silica of the character referred to above wth 0.2 gram of silver chromate. The percentage of hydrophilic sites is 6 percent. When tested in the cloud chamber ice formation is initiated at −8° C. and significant amounts of ice were obtained at −12° C., while massive amounts of ice formed at −14° C.

*Example 4*

Lead iodide was incorporated onto precipitated silica at 350° C. by solution precipitation, using 20 grams of silica to 0.2 gram of lead iodide, and stirring overnight. In the cloud chamber, ice formation is initiated at −2° C., significant amounts of ice formed at −6° C. and massive amounts of ice were produced at −14° C.

Inorganic substrates which are hydrophilic can be converted to hydrophobic sites leaving hydrophilic sites within the range of 5 to 40 percent by esterifying the surface of the substrate (such as silica, clay, magnesite, limestone, magnesia, lime or the like) with an alcohol which can be aliphatic or aromatic, and either monohydric or polyhydric. In the aliphatic alcohols it may be either straight or branched chain, of any suitable chain length, suitable examples being methyl, ethyl, butyl, lauryl, glycerol, ethylene glycol, pentaerythritol.

In cyclic alcohols, a suitable compound is benzyl alcohol or naphthyl alcohol.

The technique for esterifying is to reflux at a temperature approximating the boiling or to add a solvent such as xylene or toluene in minor amounts and reflux at about the boiling temperature of the mixture. The surface may be changed to a hydrophilic site where the substrate is basic, as for example, magnesia, lime, magnesite, dolomite, limestone or the like by reacting with an organic acid which may be either aliphatic or aromatic and where it is aliphatic it may be straight or branched chain of any suitable length. Suitable examples are acetic acid, lactic acid, succinic acid, maleic acid or maleic anhydride phenols such phenol or resorcinal and phthalic anhydride.

The reaction is suitably carried out in a solvent such as toluene or xylene or it can be adsorbed in the vapor phase if the acid is sufficiently volatile.

*Example 5*

Limestone of a particle size of 1 micron is treated with a solution of 10 percent acetic acid under reflux for two hours to create a satisfactory proportion of hydrophobic sites which creates an effective nucleating agent.

A very effective way to convert a hydrophilic substrate to hydrophobic sites is to react at the surface phenol and formaldehyde to yield a resin coating. Other resin formers such as the epoxies and the aryl ureas can also be employed.

Example 6

Silica of the character referred to above can be converted to form a satisfactory nucleating agent by reacting, with 10 grams of silica, 1 to 1.5 grams of phenol-formaldehyde solution (50% Catalin) plus a conversion catalyst, by refluxing in 100 ml. acetone. An effective nucleating agent is produced in this way.

The hydrophobic sites can be created on a hydrophilic mineral substrate by adsorbing proteins or amino acids. Suitable materials are the adsorption of L-leucine or protamines or albuminoids.

The technique of adsorption is to dissolve the material in acid solution or in ethanol or acetone and to adsorb on silica at room temperature and then dry.

Example 7

Silica of the character referred to above can be changed into an effective nucleating agent by adsorbing L-leucine from a 1% water solution using 10 grams silica to 100 ml. solution. The resulting material showed appreciable ice formation at −8° C.

A different approach to the production of an effective nucleating agent is to create the proper proportion of hydrophobic and hydrophilic sites by the initial technique of producing the nucleating agent. This is effectively illustrated by making silica suitably of colloidal size by flame hydrolysis for example of silicon halide or sulfide, the preferred material commonly used being silicon tetrachloride which is injected into a flame of hydrogen burning in oxygen.

Example 8

Silicon tetrachloride flame hydrolyzed in a hydrogen flame burning in oxygen was in the size range of 0.01 to 0.1 micron, and had an area of hydrophilic sites of 25%, which is effective as a nucleating agent.

Carbon black produced by the decomposition of a carbonaceous fuel such as natural gas in a flame burning in an inert atmosphere or without complete combustion has initially an oxidized surface which is partly hydrophobic and partly hydrophilic. This surface can by reduction or by ordinary heat treatment in inert atmosphere be converted to bring the hydrophilic surface area within the optimum range.

Example 9

For example, Mogul carbon black as produced (Cabot) has an initially hydrophilic surface area. This was converted to produce about 20% isolated hydrophilic sites by heat treating at 800° C. in an inert atmosphere for two hours. The particle size was approximately 0.01 micron. In the cloud chamber it produced significant amounts of ice at −12° C. Alternately, the reduction has been accomplished with hydrogen at 300° C. to yield a material which caused significant ice formation at −14° C.

Synthetic graphite having 300 m.²/g. has been changed to an effective nucleating agent by treating it with oxygen at 530° C. to yield a material having about 18% hydrophilic sites which caused effective nucleation. The synthetic graphite is initially hydrophobic and has hydrophilic sites created by oxidation.

In the figure we plot as the ordinate activity, that is the number of ice crystals observed divided by the number of nuclei introduced, and as the abscissa the temperature in degrees C.

Curve A is the Katz curve for standard silver iodide particles subjected to the cloud chamber, showing the high nucleating efficiency of this superior material. The curve through the temperature range gives a high activity compared to most other substances.

Curve B shows the results for the silver nitrate hydrophobic silica of the present invention and it will be evident that it is at least as good as the silver iodide at most temperatures, and at most temperatures below minus 8° C. it appears to be somewhat superior except close to −20° C. where it appears to be at least as good.

In view of our invention and disclosure variations and modifications to meet individual whim or particular need will doubtless become evident to others skilled in the art, to obtain all or part of the benefits of our invention without copying the process and composition shown, and we therefore claim all such insofar as they fall within the reasonable spirit and scope of our claims.

Having thus described our invention what we claim as new and desire to secure by Letters Patent is:

1. A method of nucleating crystallization of a hydrogen bonding crystal from a gaseous medium, which comprises seeding the medium with particles in a size range between 0.01 and 10 microns consisting of an inorganic substrate and a partial layer on the surface thereof of a different material, forming predominately hydrophobic sites, and hydrophilic sites on the surface which occupy from 5–40% of the surface area, until crystals form.

2. A method of claim 1, in which the particles are in the size range between 0.03 and 1 micron.

3. A method of claim 1, in which the hydrophilic sites occupy from 20–30% of the surface area.

4. A method of claim 1, in which the substrate essentially consists of silica.

5. A method of claim 1, in which the layer essentially consists of silver nitrate.

6. A method of claim 1 in which the layer essentially consists of silver iodide.

7. A method of claim 1, in which the layer essentially consists of silver chromate.

8. A method of claim 1, in which the layer essentially consists of lead iodide.

9. A method of claim 1, in which the layer essentially consists of an alcohol.

10. A method of claim 1, in which the substrate is basic and the layer essentially consists of an organic acid.

11. A method of claim 1, in which the layer essentially consists of a resin.

12. A method of claim 1, in which the layer essentially consists of protein.

13. A method of claim 1, in which the substrate is carbon black.

14. A method of claim 1, in which the layer is partially oxidized.

15. A method of claim 14, in which the substrate essentially consists of carbon.

16. A method of claim 1, in which the layer is reduced by hydrogen.

17. A method of claim 16, in which the substrate essentially consists of carbon black.

18. A method of nucleating crystallization of a hydrogen-bonding crystal from a gaseous medium, which comprises seeding the medium with particles in a size range between 0.01 and 10 microns essentially consisting of a mineral and a partially hydroxylated layer on the surface thereof, forming predominantly hydrophobic sites, and hydrophilic sites on the surface which occupy from 5 to 40% of the surface area, until crystals form.

19. A method of claim 18, in which the substrate essentially consists of silica.

20. A method of nucleating crystallization of a hydrogen-bonding crystal from a gaseous medium, which comprises seeding the medium with particles in a size range between 0.01 and 10 microns essentially consisting of carbon and a partially hydroxylated layer on the surface thereof, forming predominantly hydrophobic sites, and hydrophilic sites on the surface which occupy from 5 to 40% of the surface area, until crystals form.

(References on following page)

References Cited by the Examiner

UNITED STATES PATENTS

| | | | |
|---|---|---|---|
| 1,539,342 | 5/1925 | Williams | 252—317 X |
| 1,789,380 | 1/1931 | Edwards et al. | 23—209.2 |
| 2,052,626 | 9/1936 | Houghton | 239—2 |
| 2,068,987 | 1/1937 | King | 239—2 |
| 2,127,560 | 8/1938 | Haslam | 206—308 X |
| 2,210,763 | 8/1940 | King et al. | 252—317 X |
| 2,260,871 | 10/1941 | Sawyer | 106—308 X |
| 2,495,925 | 1/1950 | Foster et al. | 23—209.2 X |
| 2,527,230 | 10/1950 | Schaefer et al. | 239—2 |
| 2,527,231 | 10/1950 | Vonnegut | 239—2 |
| 2,570,867 | 10/1951 | Schaefer | 239—2 |
| 2,680,696 | 6/1954 | Broge. | |
| 2,693,140 | 11/1954 | Minton | 239—2 |
| 2,741,601 | 4/1956 | MacCready | 239—2 |
| 2,805,961 | 9/1957 | Puddington et al. | |
| 2,835,530 | 5/1958 | Schneider | 239—2 |
| 3,009,827 | 11/1961 | Deuel et al. | |
| 3,056,556 | 10/1962 | Sanger et al. | 239—2 |
| 3,127,107 | 3/1964 | Merryweather | 239—2 |

OTHER REFERENCES

Journal Meteorology, vol. 8, page 326, October 1951, Hosler article.

Physics of Precipitation, Geophysical Monograph #5, June 3–5, 1959, Mason article.

EVERETT W. KIRBY, *Primary Examiner.*